United States Patent
Roelens et al.

(10) Patent No.: US 9,118,739 B2
(45) Date of Patent: Aug. 25, 2015

(54) SYSTEM FOR EXCHANGING MESSAGES BETWEEN CUSTOMER DEVICES AND SERVERS

(75) Inventors: Wim Gabriel Andy Roelens, Temse (BE); Sylvie Adriana Louisa Maria Bracke, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 1218 days.

(21) Appl. No.: 11/225,053

(22) Filed: Sep. 14, 2005

(65) Prior Publication Data

US 2006/0075118 A1 Apr. 6, 2006

(30) Foreign Application Priority Data

Sep. 17, 2004 (EP) .................................... 04292239

(51) Int. Cl.
*G06F 15/177* (2006.01)
*H04L 29/06* (2006.01)
*H04L 29/08* (2006.01)

(52) U.S. Cl.
CPC ................ *H04L 67/42* (2013.01); *H04L 67/40* (2013.01); *H04L 69/32* (2013.01); *H04L 63/168* (2013.01)

(58) Field of Classification Search
USPC .................................................. 709/220, 206
See application file for complete search history.

(56) References Cited

U.S. PATENT DOCUMENTS

| | | | | |
|---|---|---|---|---|
| 6,457,066 | B1 * | 9/2002 | Mein et al. ..................... | 719/330 |
| 7,054,924 | B1 * | 5/2006 | Harvey et al. ................. | 709/220 |
| 7,600,003 | B1 * | 10/2009 | Okmianski et al. ........... | 709/220 |
| 2002/0032790 | A1 | 3/2002 | Linderman | |

OTHER PUBLICATIONS

Bernstein et al ("DSL Forum TR-069, CPE WAN Management Protocol", http://www.broadband-forum.org/technical/download/TR-069.pdf, May 2004, 110 pages).*
Rekasius ("First look at the WS-I Usage Scenarios", http://www.ibm.com/developerworks/webservices/library/ws-iuse/, Jan. 1, 2003, 8 pages).*
Bernstein et al., "DSL Form TR-069, CPE WAN Management Protocol", http://www.broadband-forum.org/technical/download/TR-069.pdf, May 2004.*
J. Bernstein et al, "DSL Forum, TR-069, CPE WAN Management Protocol", DSL Forum, May 2004, ppa. 1-109, XP002316355.

(Continued)

*Primary Examiner* — Liangche A Wang
(74) *Attorney, Agent, or Firm* — Fay Sharpe LLP

(57) ABSTRACT

Systems (1) for exchanging messages (10-13,40-55) between customer devices (2) such as customer premises equipment and servers (3) such as auto configuration servers at several layers comprising a first layer such as a hyper text transfer protocol layer and a second layer such as a simple object access protocol layer are made compliant to web services toolkits by, at the second layer, allowing the customer device (2) to be a requesting party only and the server (3) to be a responding party only, for so-called server method applications as well as for so-called customer device method applications. At the second layer, the server (3) is never a requesting party and the customer device (2) is never a responding party. As a result, the development of management appliances no longer needs to be done manually and the system (1) according to the invention can be used in combination with firewalls.

6 Claims, 3 Drawing Sheets

(56) References Cited

OTHER PUBLICATIONS

R. A. Van Engelen et al, "The gSOAP toolkit for Web services and peer-to-peer computing networs", Cluster Computing and the Grid 2$^{nd}$ IEEE/ACM International Symposium CCGRID2002 Berlin, Germany, May 21-24, 2002, Piscataway, NJ USA IEEE Comput. Soc. US May 21, 2002, pp. 128-135, XP010592614.

M. Cremonini et al, "An XML-Based Approach to Combine Firewalls and Web Services Security Specifications", Proceedings of the ACM Workshop on XML Security 2003, Fairfax, VA Oct. 31, 2003, NY, NY ACM, US Oct. 31, 2003, pp. 69-78, XP001198171.

\* cited by examiner

SYSTEM FOR EXCHANGING MESSAGES BETWEEN CUSTOMER DEVICES AND SERVERS

The invention relates to a system for exchanging messages between a customer device and a server at several layers comprising a first layer and a second layer, the customer device being a requesting party at the first layer and the server being a responding party at the first layer, the customer device being a requesting party at the second layer and the server being a responding party at the second layer, which second layer is higher than the first layer.

Examples of such a system are environments comprising a private part and a public part coupled to each other via a network. The customer device for example forms part of the private part, and the server for example forms part of the public part. In the system, the overall requirement is to be fullfilled that the server must be able to read (find out) and update the settings of the customer device.

A prior art system is of common general knowledge and for example in correspondence with the WT-87 management protocol, also known as TR-69. At the first lower layer, the customer device always is a requesting party or initiating party and the server always is a responding party or reacting party. At the second higher layer, the customer device might be a requesting party or a responding party respectively and the server might be a responding party or a requesting party respectively. In other words, at the first lower layer, request messages flow from the customer device to the server, and response messages flow from the server to the customer device. At the second higher layer, request messages flow from the customer device to the server or vice versa, and response messages flow from the server to the customer device or vice versa.

For so-called server method applications, the customer device can call on the server. In this case, the request message at the first layer and the request message at the second layer usually form part of one and the same packet, cell or frame, and the response message at the first layer and the response message at the second layer usually form part of one and the same packet, cell or frame. Thereby, each packet, cell or frame is processed per layer in an individual way.

For so-called customer device method applications, the server can call on the customer device. In this case, the request message at the first layer and the request message at the second layer usually do not form part of one and the same packet, cell or frame, and the response message at the first layer and the response message at the second layer usually do not form part of one and the same packet, cell or frame. The reason for this is that, at the first layer, only the customer device can transmit request messages, and only the server can transmit response messages. Therefore, an alternative way had to be found to make it possible to let the server call on the customer device. According to this alternative way, the customer device transmits a packet, cell or frame comprising a request message at the first layer and not comprising any second layer message to the server. The server detects a presence of this request message at the first layer and an absence of any message at the second layer, and knows that the customer device is offering the server a possibility of sending a request message at the second layer to the customer device. Thereto, the server transmits a packet, cell or frame comprising a response message at the first layer and a request message at the second layer to the customer device. The customer device detects these messages in the packet, cell or frame and reacts by transmitting a packet, cell or frame comprising a request message at the first layer and a response message at the second layer to the server etc. So, in this case, the request message at the first layer and the response message at the second layer usually form part of one and the same packet, cell or frame, and the response messages at the first layer and the request message at the second layer usually form part of one and the same packet, cell or frame. Thereby, again, each packet, cell or frame is processed per layer in an individual way.

The known system is disadvantageous, inter alia, owing to the fact that it is not compliant with for example web services supporting toolkits. A packet, cell or frame comprising a request message at the first layer and not comprising any second layer message contravenes the web services supporting toolkits. As a result, the development of management appliances needs to be done manually. The known system is further disadvantageous, inter alia, owing to the fact that it does not allow firewalls to be present between the customer device and the server, which firewalls forbid requests coming from the server in both lower and higher layer of the packets.

It is an object of the invention, inter alia, to provide a system as defined in the preamble which is compliant with at least some web services supporting toolkits.

The system according to the invention is characterised in that the server is not a requesting party at the second layer and the customer device is not a responding party at the second layer.

By deleting the possibility of the server being a requesting party at the second layer and the customer device being a responding party at the second layer, in other words by making it impossible that the server plays the requesting party at the second layer and the customer device plays the responding party at the second layer, the system according to the invention has become compliant with one or more web services supporting toolkits. The reason for this is that the symmetry of the messages has been restored.

The system according to the invention is firstly advantageous in that the development of management appliances no longer needs to be done manually and is secondly advantageous in that the system according to the invention can be used in combination with firewalls. Such firewalls allow request messages to flow in one direction only. Therefore, the prior art system could not be combined with a firewall, which is quite risky these days.

An embodiment of the system according to the invention is characterised in that the customer device is a customer premises equipment and the server is an auto configuration server.

The system according to the invention preferably comprises a customer premises equipment and an auto configuration server, without excluding other and further equipment and other and further servers.

An embodiment of the system according to the invention is characterised in that the first layer is a hyper text transfer protocol layer and the second layer is a simple object access protocol layer.

The system according to the invention preferably exchanges messages at a hyper text transfer protocol layer and a simple object access protocol layer, without excluding other and further layers.

An embodiment of the system according to the invention is characterised in that a first message signal comprises a request message at the first layer and a GetCPEMethod Type{ } message at the second layer, a second message signal comprises a response message at the first layer and a Method1 message at the second layer, a third message signal comprises a request message at the first layer and a GetMethod1Arguments{id} message at the second layer, a fourth message signal comprises a response message at the first layer and a Method1Arguments message at the second layer, and a fifth message signal comprises a request message at the first layer and a SetMethod1Result{id,result} message at the second layer.

In this case, the overhead and the complexity have increased, owing to the fact that five message signals need to be exchanged according to the invention, compared to only three message signals needing to be exchanged in accordance with the prior art. The five message signals are necessary for performing a session with one or more so-called remote procedure calls. According to the prior art, only three message signals were necessary for performing a session with one or more so-called remote procedure calls.

An embodiment of the system according to the invention is characterised in that a sixth message signal comprises a response message at the first layer and a Method2 message at the second layer.

In this case, the sixth message signal is used for starting the next session with one or more remote procedure calls.

The invention also relates to a method for exchanging messages between a customer device and a server at several layers comprising a first layer and a second layer, the method comprising the steps of
at the first layer, transmitting a request message from the customer device to the server and transmitting a response message from the server to the customer device,
at the second layer, transmitting a request message from the customer device to the server and transmitting a response message from the server to the customer device, which second layer is higher than the first layer, characterized in that the method comprises the step of
at the second layer, not transmitting a request message from the server to the customer device and not transmitting a response message from the customer device to the server.

Instead of comprising the step of, at the second layer, not transmitting a request message from the server to the customer device and not transmitting a response message from the customer device to the server, alternatively, the method according to the invention might be characterised in that the method does not comprise the step of, at the second layer, transmitting a request message from the server to the customer device and transmitting a response message from the customer device to the server.

The invention yet also relates to a processor program product for exchanging messages between a customer device and a server at several layers comprising a first layer and a second layer, the processor program product comprising the functions of
at the first layer, transmitting a request message from the customer device to the server and transmitting a response message from the server to the customer device,
at the second layer, transmitting a request message from the customer device to the server and transmitting a response message from the server to the customer device, which second layer is higher than the first layer, characterized in that the processor program product comprises the function of
at the second layer, not transmitting a request message from the server to the customer device and not transmitting a response message from the customer device to the server.

Instead of comprising the function of, at the second layer, not transmitting a request message from the server to the customer device and not transmitting a response message from the customer device to the server, alternatively, the processor program product according to the invention might be characterised in that the processor program product does not comprise the function of, at the second layer, transmitting a request message from the server to the customer device and transmitting a response message from the customer device to the server.

The invention also relates to a customer device for exchanging messages with a server at several layers comprising a first layer and a second layer, the customer device comprising
a customer device transmitter for, at the first layer, transmitting a request message to the server and, at the second layer, transmitting a request message to the server, and
a customer device receiver for, at the first layer, receiving a response message from the server and, at the second layer, receiving a response message from the server, which second layer is higher than the first layer, characterized in that the customer device transmitter is arranged for, at the second layer, not transmitting a response message to the server and the customer device receiver is arranged for, at the second layer, not receiving a request message from the server.

Instead of the customer device transmitter being arranged for, at the second layer, not transmitting a response message to the server and the customer device receiver being arranged for, at the second layer, not receiving a request message from the server, alternatively, the customer device according to the invention might be characterised in that the customer device transmitter is not arranged for, at the second layer, transmitting a response message to the server and the customer device receiver is not arranged for, at the second layer, receiving a request message from the server.

The invention yet also relates to a server for exchanging messages with a customer device at several layers comprising a first layer and a second layer, the server comprising
a server receiver for, at the first layer, receiving a request message from the customer device and, at the second layer, receiving a request message from the customer device, and
a server transmitter for, at the first layer, transmitting a response message to the customer device and, at the second layer, transmitting a response message to the customer device, which second layer is higher than the first layer, characterized in that the server receiver is arranged for, at the second layer, not receiving a response message from the customer device and the server transmitter is arranged for, at the second layer, not transmitting a request message to the customer device.

Instead of the server receiver being arranged for, at the second layer, not receiving a response message from the customer device and the server transmitter being arranged for, at the second layer, not transmitting a request message to the customer device, alternatively the server might be characterised in that the server receiver is not arranged for, at the second layer, receiving a response message from the customer device and the server transmitter is not arranged for, at the second layer, transmitting a request message to the customer device.

And the invention relates to a message signal to be exchanged between a customer device and a server at several layers comprising a first layer and a second layer, characterised in that the message signal comprises at least one of a GetCPEMethodType{ } message, a Method1 message, a GetMethod1Arguments{id} message, a Method1Arguments message, a SetMethod1Result{id,result} message and a response Method2 message.

Embodiments of the method according to the invention and of the processor program product according to the invention and of the customer device according to the invention and of the server according to the invention and of the message signal according to the invention correspond with the embodiments of the system according to the invention.

The invention is based upon an insight, inter alia, that web services toolkits require symmetrical message signals, and is based upon a basic idea, inter alia, that the server should never be a requesting party at the second layer and the customer device should never be a responding party at the second layer.

The invention solves the problem, inter alia, to provide a system as defined in the preamble which is compliant with at least some web services supporting toolkits, and is advantageous, inter alia, in that the development of management appliances no longer needs to be done manually and in that the system according to the invention can be used in combination with firewalls.

These and other aspects of the invention will be apparent from and elucidated with reference to the embodiments(s) described hereinafter.

Figure 1:
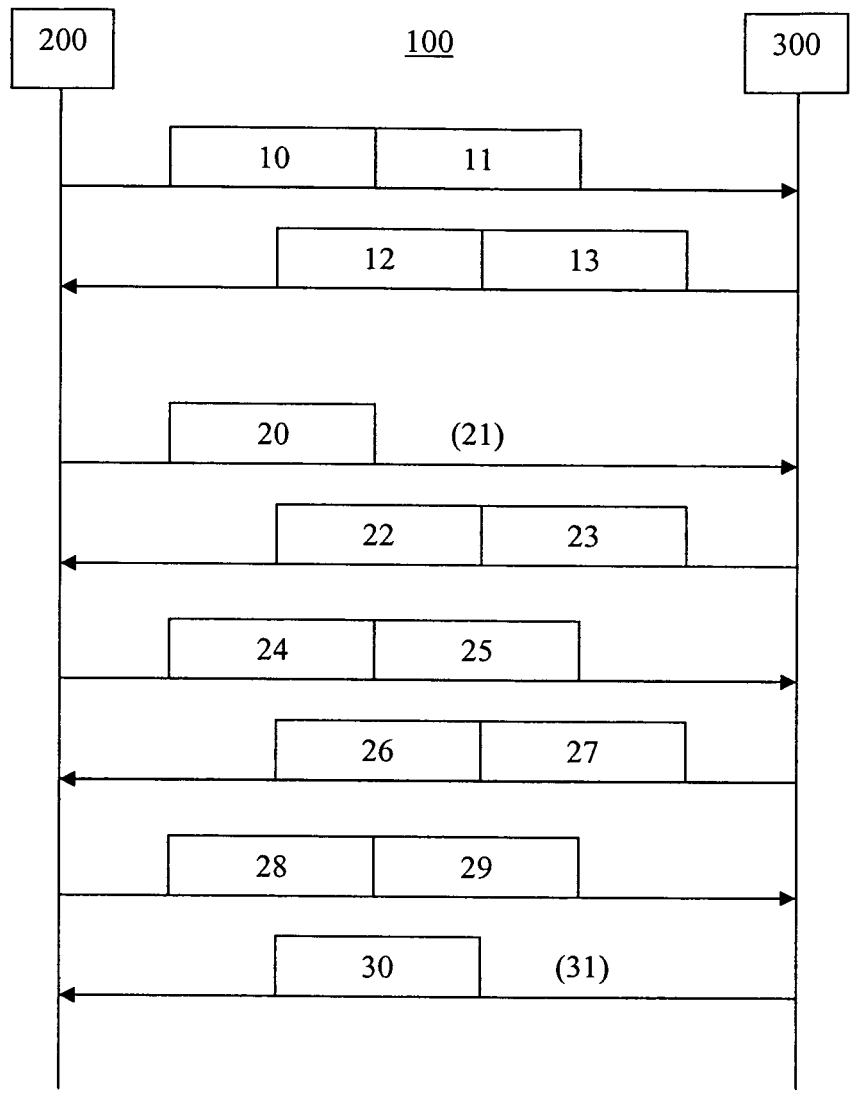
FIG. 1 shows a message chart for a prior art system comprising a prior art customer device and a prior art server.

In FIG. 1 (prior art) showing a message chart for a prior art system 100 comprising a prior art customer device 200 and a prior art server 300, the blocks 10-13 are related to the so-called server method applications, whereby the customer device 200 can call on the server 300. The blocks 20-31 are related to the so-called customer device method applications, whereby the server 300 can call on the customer device 200. These blocks have the following meaning:

Block 10: Request message at a first layer.
Block 11: Request message at a second layer.

This represents a server method e.g. a TR69 Inform message, a request that informs the server of activity and starts a session in which other requests in both directions can be done.

Block 12: Response message at the first layer.
Block 13: Response message at the second layer This represents a server method response e.g. a TR69 InformResponse message, a response that answers the inform.

Block 20: Request message at the first layer.
Block 21: Missing request message at the second layer.
Block 22: Response message at the first layer.
Block 23: Request message at the second layer.

This represents a first customer device method e.g. a TR69 setParameterValues(parameter struct1), a request that asks the customer device to set its parameter values according to the values of the passed struct1.

Block 24: Request message at the first layer.
Block 25: Response message at the second layer.

This represents the corresponding customer device method response e.g. a TR69 setParameterValuesResponse, a response that informs the server that the request was executed.

Block 26: Response message at the first layer.
Block 27: Request message at the second layer.

This represents a second customer device method e.g. a TR69 setParameterValues(parameter struct2), a request that asks the customer device to set its parameter values according to the values of the passed struct1.

Block 28: Request message at the first layer.
Block 29: Response message at the second layer.

This represents the corresponding customer device method response e.g. a TR69 setParameterValuesResponse, a response that informs the server that the request was executed.

Block 30: Response message at the first layer.
Block 31: Missing response message at the second layer.

With respect to the so-called server method applications, whereby the customer device 200 can call on the server 300, the request message 10 at the first layer and the request message 11 at the second layer usually form part of one and the same message signal 10,11 transported by a packet, cell or frame, and the response message 12 at the first layer and the response message 13 at the second layer usually form part of one and the same message signal 12,13 transported by a packet, cell or frame.

With respect to the so-called customer device method applications, whereby the server 300 can call on the customer device 200, the request message 20,24,28 at the first layer and the request message 23,27 at the second layer usually do not form part of one and the same message signal transported by a packet, cell or frame, and the response message 22,26,30 at the first layer and the response message 25,29 at the second layer usually do not form part of one and the same message signal transported by a packet, cell or frame. The reason for this is that, at the first layer, only the customer device 200 can transmit request messages, and only the server 300 can transmit response messages. Therefore, an alternative way had to be found to make it possible to let the server 300 call on the customer device 200. According to this alternative way, the customer device 200 transmits a packet, cell or frame comprising a request message 20 at the first layer and not comprising any second layer message 21 to the server 300. The server 300 detects a presence of this request message 20 at the first layer and an absence of any message 21 at the second layer, and knows that the customer device 200 is offering the server 300 a possibility of sending a request message 23 at the second layer to the customer device 200. Thereto, the server 300 transmits a packet, cell or frame comprising a response message 22 at the first layer and a request message 23 at the second layer to the customer device 200. The customer device 200 detects these messages in the packet, cell or frame and reacts by transmitting a packet, cell or frame comprising a request message 24 at the first layer and a response message 25 at the second layer to the server 300 etc. So, in this case, the request message at the first layer and the response message at the second layer usually form part of one and the same packet, cell or frame, and the response messages at the first layer and the request message at the second layer usually form part of one and the same packet, cell or frame.

The known system 100 is disadvantageous, inter alia, owing to the fact that it is not compliant with for example web services supporting toolkits such as for example the WS (Web Services) Basic Profile 1.0. A packet, cell or frame comprising a request message at the first layer and not comprising any second layer message contravenes the web services supporting toolkits. The invention as shown in FIGS. 2 and 3 solves this problem, whereby, for example, the customer device 2 is a customer premises equipment and the server 3 is an auto configuration server, without excluding other and further equipment and other and further servers, and, for example, the first layer is a hyper text transfer protocol layer and the second layer is a simple object access protocol layer, without excluding other and further layers.

Figure 2:
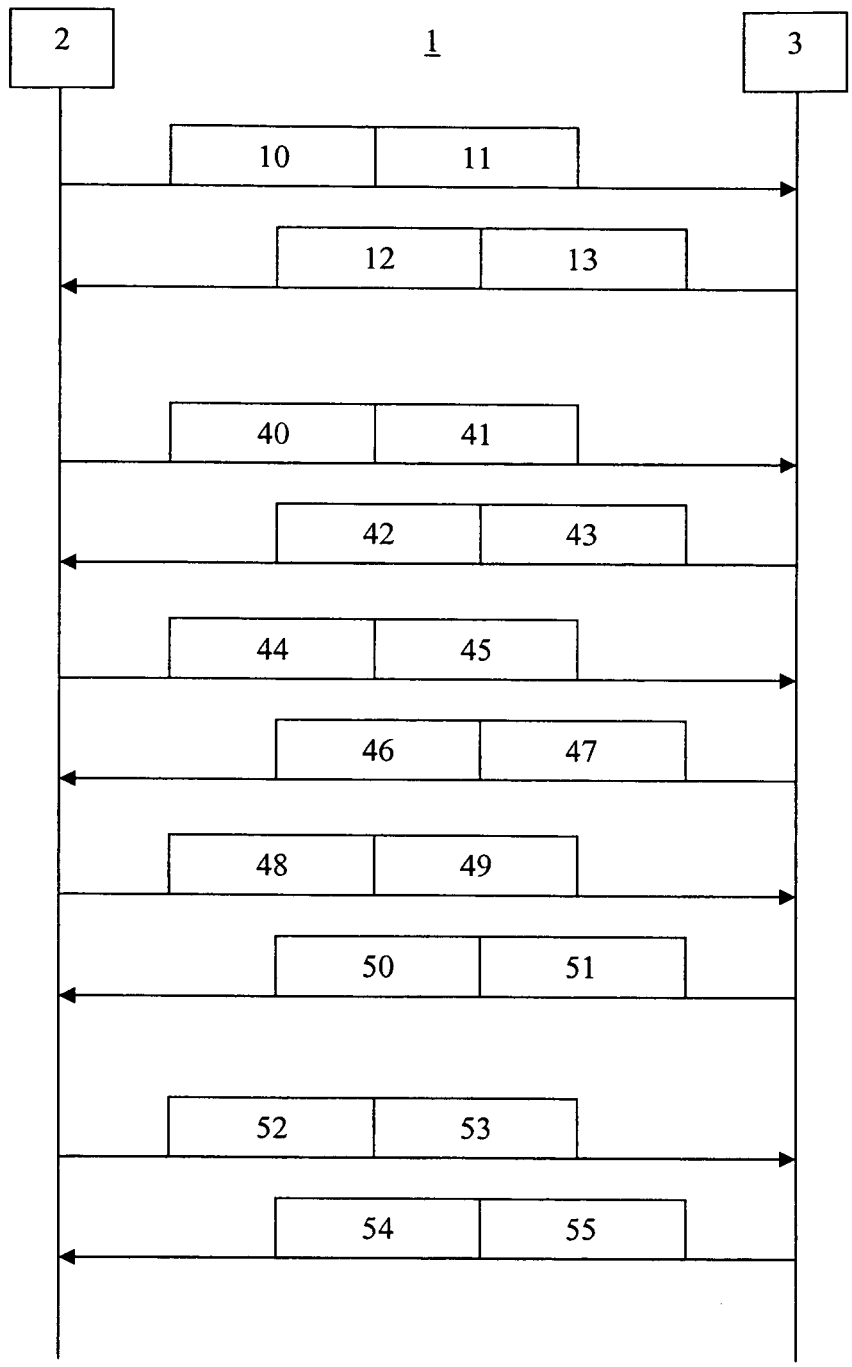
FIG. 2 shows a message chart for a system according to the invention comprising a customer device according to the invention and a server according to the invention.
Figure 3:
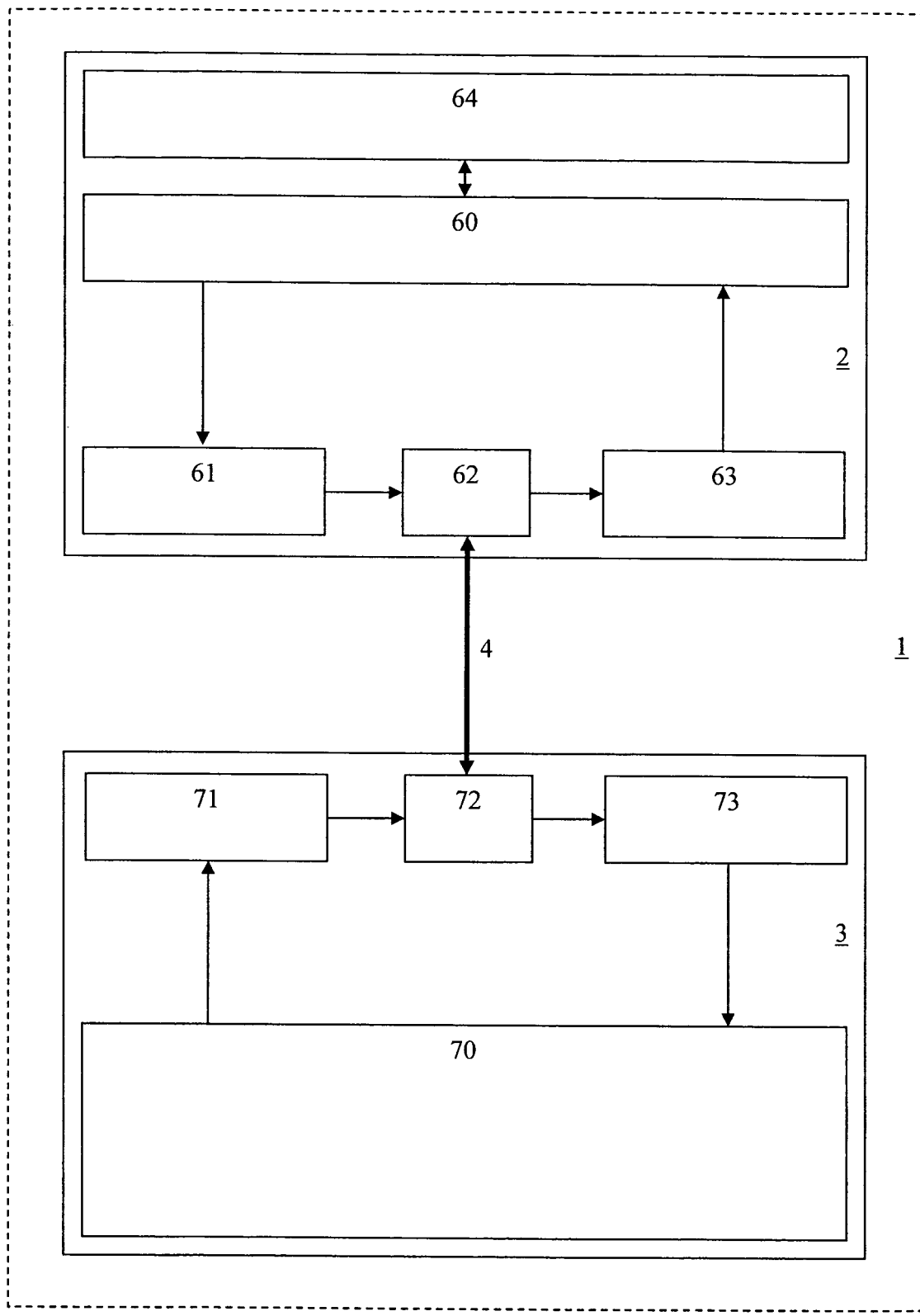
FIG. 3 shows diagrammatically a system according to the invention comprising a customer device according to the invention and a server according to the invention.

In FIG. 2 (invention) showing a message chart for a system 1 according to the invention comprising a customer device 2 according to the invention and a server 3 according to the invention, the blocks 10-13 are related to the so-called server method applications, whereby the customer device 2 can call on the server 3. The blocks 40-55 are related to the so-called customer device method applications, whereby the server 3 can call on the customer device 2. These blocks have the following meaning:

Block 10: Request message at a first layer.
Block 11: Request message at a second layer.
This represents a server method e.g. a TR69 Inform message, a request that informs the server of activity and starts a session in which other requests in both directions can be done.
Block 12: Response message at the first layer.
Block 13: Response message at the second layer.
This represents a server method response e.g. a TR69 InformResponse message, a response that answers the inform.
Block 40: Request message at the first layer.
Block 41: Request message at the second layer.
This represents a server method asking which task the customer device needs to perform: getServerMethodType.
Block 42: Response message at the first layer.
Block 43: Response message at the second layer.
This represents a server method response, answering which task the customer device needs to perform e.g. setParameterValues.
Block 44: Request message at the first layer.
Block 45: Request message at the second layer. This represents a server method asking the arguments with which the task needs to be performed e.g. getSetParameterValuesArguments.
Block 46: Response message at the first layer.
Block 47: Response message at the second layer.
This represents a server method response answering which parameters need to be set e.g. parameterstruct1 which is a list of name, value pairs.
Block 48: Request message at the first layer.
Block 49: Request message at the second layer.
This represents a server method that is setting the result of execution on the server e.g. setSetParameterValuesResult is setting the result of the execution, the passed value could be e.g. "success" or "fault".
Block 50: Response message at the first layer.
Block 51: Response message at the second layer.
This represents the corresponding server method response. This response can contain the method name of a second operation that the server wants to be executed on the customer device, or it can contain no data if no more operations need to be executed. In the second case, it is just allowing the customer device to know that the server has correctly processed the server method.
Block 52: Request message at the first layer.
Block 53: Request message at the second layer.
This represents the next server method in the case a second operation was passed in block 51. In that case, the rest of the message flow is the same as from block 45.
Block 54: Response message at the first layer.
Block 55: Response message at the second layer.

With respect to the so-called server method applications, whereby the customer device 2 can call on the server 3, the request message 10 at the first layer and the request message 11 at the second layer usually form part of one and the same message signal 10,11 transported by a packet, cell or frame, and the response message 12 at the first layer and the response message 13 at the second layer usually form part of one and the same message signal 12,13 transported by a packet, cell or frame. So, for the server method applications, there are no differences between the prior art and the invention.

With respect to the so-called customer device method applications, whereby the server 3 can call on the customer device 2, there are many differences between the prior art and the invention, general differences and particular differences.

About the general differences, according to the invention, a request message at the first layer and a response message at the second layer are no longer combined in one and the same message signal, and a response message at the first layer and a request message at the second layer are no longer combined in one and the same message signal.

About the more particular differences, a first message signal 40,41 comprises for example a request message 40 at the first layer and a GetCPEMethodType{ } message 41 at the second layer, a second message signal 42,43 comprises for example a response message 42 at the first layer and a Method1 message 43 at the second layer, a third message signal 44,45 comprises for example a request message 44 at the first layer and a GetMethod1Arguments{id} message 45 at the second layer, a fourth message signal 46,47 comprises for example a response message 46 at the first layer and a Method1Arguments message 47 at the second layer, a fifth message signal 48,49 comprises for example a request message 48 at the first layer and a SetMethod1Result{id,result} message 49 at the second layer, a sixth message signal 50,51 comprises for example a response message 50 at the first layer and a Method2 message 51 at the second layer, a seventh message signal 52,53 comprises for example a request message 52 at the first layer and a GetMethod2Arguments{id} message 53 at the second layer and an eighth message signal 54,55 comprises for example a response message 54 at the first layer and a Method2Arguments message 55 at the second layer.

The GetCPEMethodType{ } message 41 at the second layer is a request message at the second layer, the Method1 message 43 at the second layer is a response message at the second layer, the GetMethod1Arguments{id} message 45 at the second layer is a request message at the second layer, the Method1Arguments message 47 at the second layer is a response message at the second layer, and the SetMethod1Result{id,result} message 49 at the second layer is a request message at the second layer. So, as a result, according to the invention a request message at the first layer is always combined with a request message at the second layer and a response message at the first layer is always combined with a response message at the second layer. But the second layer messages are such that, after a session comprising one or more remote procedure calls each comprising one or more exchanged message signals, the final state of the customer device 2 and of the server 3 is the same as if the server 3 would have had the possibility to do a request and as if the customer device would have had the possibility to respond to that request.

In other words, the customer device method applications or CPE method applications are mapped to the web services by splitting each CPE remote procedure call method into three web services calls:

I) get<CPEMethod>Type{ }, returning a <CPEMethod>Type message containing type and id.

II) get<CPEMethod>Argument{id}, where <CPEmethod> depends on the return type of the previous call, returning a <CPEMethod>Argument message.

After the customer device 2 has executed the method locally it calls a third web service call:

III) set<CPEMethod>Response{id,methodResult}, which passes a methodResult indicating the result of the CPE Method (success or fault). This method returns the next <CPEMethod>Type if the server 3 needs to call another CPE method, or not (if not, a "null" is returned, which is completely different from an empty hyper text transfer protocol request: the "null" is represented by bits defining this "null", with a web services toolkit being written to recognize these bits automatically).

The CPE method context can be kept by using a method id which is shared over the three remote procedure calls. The system 1 according to the invention has many advantages:

A) Rapid application development for both server and customer device developers, because web services toolkits become available.

B) Use of a WSDL (Web Services Description Language) minimizes interoperability issues between the customer device and the server.

C) web services specific security packages become available for securing the customer device-server communication e.g. WSS4J (web services security for java).

D) UDDI (Universal Discovery Description & Integration) can be used as a registry: the server publishes its service and the customer device can look it up, so no need to preconfigure the customer device where the server is located.

E) Deployability increases e.g. new server software releases can be deployed remotely through the firewalls.

F) web services is growing and evolving very rapidly in the IT world. A customer device management protocol that is based on web services can profit from future extensions.

In FIG. 3 (invention) a system 1 according to the invention is shown diagrammatically comprising a customer device 2 according to the invention and a server 3 according to the invention. The customer device 2 according to the invention comprises a customer device processor system 60 coupled to a customer device transmitter 61 and to a customer device receiver 63. The customer device transmitter 61 and the customer device receiver 63 are further coupled to a customer device interface 62 which is further coupled to a coupling 4 such as for example a wired (analog, integrated services digital network, digital subscriber line) electrical or optical coupling or a wireless (GSM, UMTS) coupling. The customer device processor system 60 is further coupled to a customer device man machine interface 64.

The server 3 according to the invention comprises a server processor system 70 coupled to a server transmitter 71 and to a server receiver 73. The server transmitter 71 and the server receiver 73 are further coupled to a server interface 72 which is coupled to the coupling 4. In practice, the server 3 will be coupled to many customer devices 2 via one or more switches, multiplexers, bridges, forwarders, routers etc. all not shown.

In the system 1 according to the invention, the overall requirement is to be fullfilled that the server 3 according to the invention must be able to read (find out) and update the settings of the customer device 2 according to the invention.

According to the invention, the customer device transmitter 61 is arranged for, at the second layer, not transmitting a response message 25 to the server 3 and the customer device receiver 63 is arranged for, at the second layer, not receiving a request message 23 from the server 3. In other words, the customer device processor system 60 is designed to process a combination of a request message at the first layer and a request message at the second layer and is designed to process a combination of a response message at the first layer and a response message at the second layer. The customer device processor system 60 is disabled to process a combination of a request message at the first layer and a response message at the second layer and is disabled to process a combination of a response message at the first layer and a request message at the second layer.

According to the invention, the server receiver 73 is arranged for, at the second layer, not receiving a response message 25 from the customer device 2 and the server transmitter 71 is arranged for, at the second layer, not transmitting a request message 23 to the customer device 2. In other words, the server processor system 70 is designed to process a combination of a request message at the first layer and a request message at the second layer and is designed to process a combination of a response message at the first layer and a response message at the second layer. The server processor system 70 is disabled to process a combination of a request message at the first layer and a response message at the second layer and is disabled to process a combination of a response message at the first layer and a request message at the second layer.

The expression "for" in for example "for exchanging", "for transmitting" and "for receiving" etc. does not exclude that other functions are performed as well, simultaneously or not. The expressions "X coupled to Y" and "a coupling between X and Y" and "coupling/couples X and Y" etc. do not exclude that an element Z is in between X and Y. The expressions "P comprises Q" and "P comprising Q" etc. do not exclude that an element R is comprised/included as well. The terms "a" and "an" do not exclude the possible presence of one or more pluralities.

The steps/functions of for example "transmitting" and "not transmitting" etc. do not exclude further steps/functions, such as for example, inter alia, the steps/functions described in the specification.

The invention claimed is:

1. A customer device for exchanging messages with a server at several layers comprising a first layer and a second layer, the customer device comprising:

a customer device transmitter operative to, at the first layer, transmit a request message to the server and, at the second layer, transmit a request message to the server; and a customer device receiver operative to, at the first layer, receive a response message from the server and, at the second layer, receive a response message from the server, wherein the second layer is higher than the first layer and the customer device transmitter is operative to:

transmit a first message signal comprising a request message at the first layer and a request message for requesting from said server a task the customer device needs to perform, at the second layer;

receive a second message signal comprising a response message at the first layer and a response message including said task said customer device needs to perform, at the second layer;

transmit a third message signal comprising a request message at the first layer and a request message for asking said server for a plurality of argument values said customer device needs to perform said task, at the second layer;

receive a fourth message signal comprising a response message at the first layer and a response message including said plurality of argument values said customer device needs to perform said task, at the second layer;

transmit a fifth message signal comprising a request message at the first layer and a request message for setting the result of execution of said task on the server, at the second layer; and receive a sixth message signal comprising a response message at the first layer and a Method2 message, at the second layer;

wherein the sixth message signal starts a next session with one or more remote procedure calls.

2. A system operative to exchange messages between a customer device according to claim 1 and a server at several layers comprising a first layer and a second layer, the customer device being a requesting party at the first layer and the server being a responding party at the first layer, the customer device being a requesting party at the second layer and the server being a responding party at the second layer, wherein said second layer is higher than the first layer, wherein a first message signal comprises a request message at the first layer and a request message for requesting from said server a task the customer device needs to perform, at the second layer, a second message signal comprises a response message at the first layer and a response message including said task the customer device needs to perform, at the second layer, a third message signal comprises a request message at the first layer and a request message for asking from said server a plurality of argument values said customer device needs to perform said task, at the second layer, a fourth message signal comprises a response message at the first layer and a response message including said plurality of argument values said customer device needs to perform said task, at the second layer, and a fifth message signal comprises a request message at the first layer and a request message for setting the result of execution of said task on the server, at the second layer.

3. A server for use in a system according to claim 2 operative to exchange messages with a customer device at several layers comprising a first layer and a second layer, the server comprising:

a server receiver operative to, at the first layer, receive a request message from the customer device and, at the second layer, receive a request message from the customer device, and a server transmitter operative to, at the first layer, transmit a response message to the customer device and, at the second layer, transmit a response message to the customer device, wherein the second layer is higher than the first layer and the server receiver is operative to:

receive a first message signal comprising a request message at the first layer and a request message requesting from said server a task the customer device needs to perform, at the second layer;

transmit a second message signal comprising a response message at the first layer and a response message including said task the customer device needs to perform, at the second layer;

receive a third message signal comprising a request message at the first layer and a request message for asking said server for a plurality of argument values said customer device needs to perform said task, at the second layer;

transmit a fourth message signal comprising a response message at the first layer and a response message including said plurality of argument values said customer device needs to perform said task, at the second layer;

receive a fifth message signal comprising a request message at the first layer and a request message for setting the result of execution of said task by said customer device on the server, at the second layer.

4. A system as defined in claim 2, wherein the customer device is customer premises equipment and the server is an auto configuration server.

5. A system as defined in claim 2, wherein the first layer is a hyper text transfer protocol layer and the second layer is a simple object access protocol layer.

6. A method for exchanging messages between a customer device and a server at several layers comprising a first layer and a second layer, the method comprising:

at the first layer, receiving a request message from the customer device at the server and transmitting a response message from the server to the customer device;

at the second layer, receiving a request message from the customer device at the server and transmitting a response message from the server to the customer device, wherein the second layer is higher than the first layer;

receiving a first message signal comprising a request message at the first layer and a request message for requesting from said server a task the customer device needs to perform, at the second layer;

transmitting a second message signal comprising a response message at the first layer and a response message including said task the customer device needs to perform, at the second layer;

receiving a third message signal comprising a request message at the first layer and a request message asking said server for a plurality of argument values said customer device needs to perform said task, at the second layer;

transmitting a fourth message signal comprising a response message at the first layer and a response message including said plurality of argument values the customer device needs to perform said task, at the second layer;

receiving a fifth message signal comprising a request message at the first layer and a request message for setting the result of execution of said customer device method on the server, at the second layer; and transmitting a sixth message signal comprising a sixth message signal comprising a response message at the first layer and a Method2 message, at the second layer;

wherein the sixth message signal starts a next session with one or more remote procedure calls.

* * * * *